UNITED STATES PATENT OFFICE.

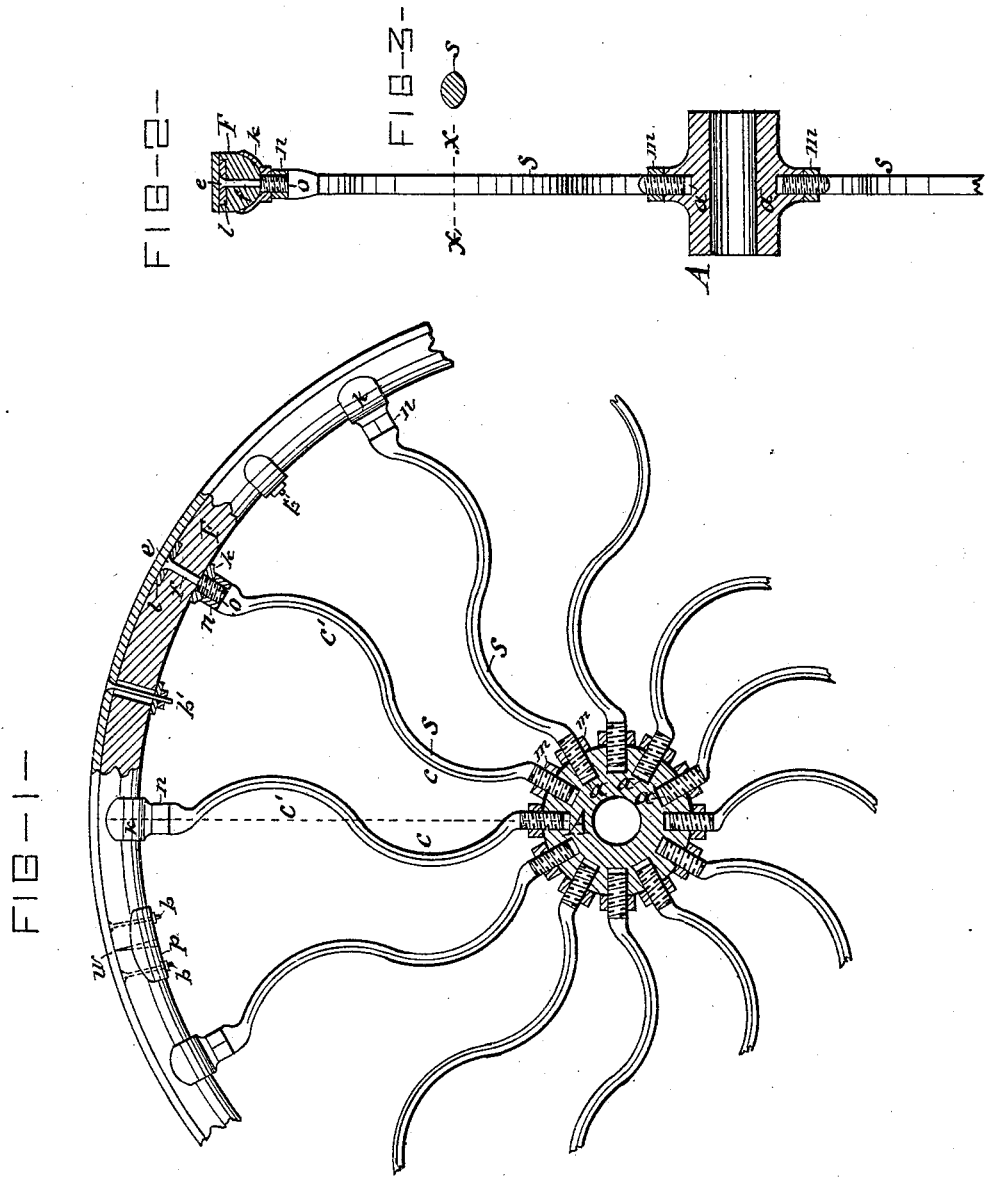

JAMES CARPENTER, OF MORAVIA, NEW YORK.

VEHICLE-WHEEL.

SPECIFICATION forming part of Letters Patent No. 250,644, dated December 13, 1881.

Application filed April 13, 1881. (No model.)

*To all whom it may concern:*

Be it known that I, JAMES CARPENTER, of Moravia, in the county of Cayuga, in the State of New York, have invented new and useful Improvements in Vehicle-Wheels, of which the following, taken in connection with the accompanying drawings, is a full, clear, and exact description.

This invention consists in a peculiar construction of a wheel supporting its hub yieldingly and adjustably in a concentric position, whereby all violent shocks to the vehicle incident to its travel over rough roads are obviated.

In the accompanying drawings, Figure 1 is a side view of a portion of a wheel embodying my invention. Fig. 2 is a transverse section of same, and Fig. 3 is a transverse section of the spoke on line $x\ x$.

A represents the hub of the wheel, provided with screw-threaded cylindrical mortises or sockets $a$, into which are screwed the inner ends of the spokes S, which are further secured by jam-nuts $m$. Said spokes I prefer to make oval or elliptic in cross-section with the greater diameter thereof parallel to the axis of the wheel, as illustrated in Fig. 3 of the drawings, so as to brace the spokes laterally and allow them to spring in the direction of the circumference of the wheel. The spokes are bent or sprung into reverse curves $c\ c'$, within the plane of the wheel, so as to form springs capable of exerting both a tensile and resilient force in the direction of their length without diverting from the plane of the wheel. In order to avoid undue strain on the respective connections of the extremities of the spokes, the sockets in the hub and felly for each spoke are arranged in a true radial line, as indicated by dotted line in Fig. 1 of the drawings. The outer extremity of the spoke is swiveled in the felly F by a spindle, $f$, formed on the end of the spoke, which spindle passes through the felly and through a washer, $l$, countersunk in the outer periphery of the felly. The extremity of the spindle $f$ is upset to form a head, $e$, which is countersunk in the washer $l$. At the inner periphery of the felly, the spoke is provided with a screw-threaded portion, $o$, on which is a nut, $n$, which is brought to bear against a clip, $k$, embracing the inner face and the two sides of the felly, said clip serving not only to afford a proper bearing for the nut $n$, as aforesaid, but also to brace the felly, so as to prevent its splitting.

The described connection of the spokes with the felly allows the spokes to be turned on their axis, and by so doing the inner threaded end of the spokes is caused to either enter or withdraw from the sockets $a$ of the hub. The aforesaid withdrawal of the spoke produces a pressure of same toward the periphery of the wheel, which pressure being resisted by the tire T, causes the latter to become firmly set and tightened on the felly. The aforesaid pressure can be further increased by turning the nut $n$ so as to work toward the felly. This adjustment allows all the spokes to be brought to a uniform tension, so that normally the hub is maintained in a concentric position in the wheel. By tightening the jam-nuts $m$ the spokes are prevented from turning, and thus retained at their requisite tension. The hub A, being supported yieldingly in its concentric position by the spring-spokes S, in the manner described, is thus relieved of the shocks incident to the travel of the periphery of the wheel over rough roads. The compression of the spokes of the lower half of the wheel is in a great measure counteracted by the tension of the spokes of the upper half of the wheel, each spoke exerting its force proportionate to the spoke diametrically opposite. The strain is thus equalized and the felly maintained in its true circular form.

$w$ represents a wedge introduced in the joint between the sections of the felly, for the purpose of compensating for the distension of the periphery of the wheel by the before-described adjustment thereof, said wedge being retained in position by a plate, $p$, applied to the inner side of the felly, and embracing partly the sides thereof and secured thereto by bolts $b\ b$, passing through the felly and plate. The holes in the felly through which the bolts pass are elongated to allow the respective sections of the felly the requisite movement in distending the periphery of the wheel. The same provision is made with reference to the bolts $b'$, that fasten the tire to the felly.

Having described my invention, what I claim is—

1. A wheel having flexible spokes curved in the direction of their length, and the ends of said spokes made straight and set into true radial sockets in the hub and felly, substantially as shown and described.

2. A wheel having its hub sustained yieldingly and adjustably in its concentric position by spokes made of flexible material, curved or sprung out of a true radial line, and having straight cylindrical ends in true radial sockets in the hub and felly, the sockets of the hub being screw-threaded to receive the correspondingly-threaded inner ends of the spokes, all constructed and combined substantially as described and shown.

3. The combination of the hub A, provided with screw-threaded sockets $a$, the spokes S, formed with reverse curves $c$ $c'$, and having their inner end screw-threaded, and their outer end swiveled in the felly and shouldered against the inner and outer periphery thereof, substantially as shown and set forth.

4. The combination of the hub provided with screw-threaded sockets $a$, the reverse-curved spokes S, screwed into said sockets and provided at their outer end with the threaded portion $o$, spindle $f$, and head $e$, the felly F, provided with the clip $k$, and washer $l$, and the adjusting-nut $n$, all constructed and combined substantially in the manner described and shown.

In testimony whereof I have hereunto signed my name and affixed my seal, in the presence of two attesting witnesses, at Syracuse, in the county of Onondaga, in the State of New York, this 5th day of April, 1881.

JAMES CARPENTER. [L. S.]

Witnesses:
 WM. C. RAYMOND,
 C. BENDIXON.